US008955431B2

(12) United States Patent
Starr et al.

(10) Patent No.: US 8,955,431 B2
(45) Date of Patent: Feb. 17, 2015

(54) IMPRINT TOOL

(71) Applicants: David Starr, Woodridge, IL (US); Erin Smith, Woodridge, IL (US); Traci Chapple, Woodridge, IL (US); Stephanie Goode, Woodridge, IL (US); Mason Umholtz, Woodridge, IL (US); Angie Lullie, Woodridge, IL (US); John McDavitt, Woodridge, IL (US)

(72) Inventors: David Starr, Woodridge, IL (US); Erin Smith, Woodridge, IL (US); Traci Chapple, Woodridge, IL (US); Stephanie Goode, Woodridge, IL (US); Mason Umholtz, Woodridge, IL (US); Angie Lullie, Woodridge, IL (US); John McDavitt, Woodridge, IL (US)

(73) Assignee: Wilton Industries, Inc., Woodridge, IL (US)

( * ) Notice: Subject to any disclaimer, the term of this patent is extended or adjusted under 35 U.S.C. 154(b) by 43 days.

(21) Appl. No.: 13/767,338

(22) Filed: Feb. 14, 2013

(65) Prior Publication Data

US 2014/0227412 A1    Aug. 14, 2014

(51) Int. Cl.
*B31F 1/07* (2006.01)
*B41F 19/02* (2006.01)
*B44B 5/00* (2006.01)
*A23P 1/10* (2006.01)

(52) U.S. Cl.
CPC ...................................... *A23P 1/105* (2013.01)
USPC ................... 101/18; 101/4; 101/29; 101/103; 101/109; 101/369; 101/373; 101/391

(58) Field of Classification Search
CPC ............ B41F 17/00; B41J 1/20; B44B 11/04; B44B 5/026; B44B 5/0085
USPC ............ 101/4, 18, 28, 29, 32, 103, 109, 327, 101/333, 391, 369, 373, 405, 406; 425/92, 425/298, 299; 426/383
See application file for complete search history.

(56) References Cited

U.S. PATENT DOCUMENTS

| 921,974 | A | * | 5/1909 | Ginsburg | 101/28 |
|---|---|---|---|---|---|
| 1,190,497 | A | * | 7/1916 | Willard | 101/381 |
| 1,225,712 | A | * | 5/1917 | Hoskins | 101/374 |
| 1,731,651 | A | * | 10/1929 | Denhof | 101/381 |
| 1,739,110 | A | * | 12/1929 | Wheeler | 101/381 |
| 1,763,090 | A | * | 6/1930 | Buzza | 276/38 |
| 4,204,470 | A | | 5/1980 | Craighead | |
| 4,424,601 | A | | 1/1984 | Weber | |
| 4,818,207 | A | | 4/1989 | Heron | |
| 5,579,582 | A | | 12/1996 | Carlson | |

(Continued)

FOREIGN PATENT DOCUMENTS

GB    2045687    11/1980
SU    374798 A3    5/1973

OTHER PUBLICATIONS

Notification of Transmittal of the International Search Report and the Written Opinion of the International Searching Authority, for PCT/US2014/016302, dated May 15, 2014, 7 pages.

*Primary Examiner* — Ren Yan
*Assistant Examiner* — Marissa Ferguson Samreth
(74) *Attorney, Agent, or Firm* — Foley & Lardner LLP

(57) ABSTRACT

An imprinter for creating impressions of designs in media such as buttercream, fondant, gum paste, modeling dough, and cookie dough for decoration. The imprinter includes a retainer having a retainer body and at least one retaining portion and a lock configured to be received by the retainer. The lock has a lock retaining portion engageable with the retaining portion of the retainer to selectably secure the lock to the retainer.

16 Claims, 6 Drawing Sheets

(56) References Cited

U.S. PATENT DOCUMENTS

| | | |
|---|---|---|
| 7,252,491 B2 | 8/2007 | Errera |
| 7,331,776 B2 | 2/2008 | Errera |
| 2002/0046669 A1* | 4/2002 | Lookholder et al. ........ 101/401.1 |
| 2006/0225579 A1 | 10/2006 | Errera |
| 2010/0068321 A1 | 3/2010 | Errera |
| 2010/0078856 A1 | 4/2010 | Cueto |

* cited by examiner

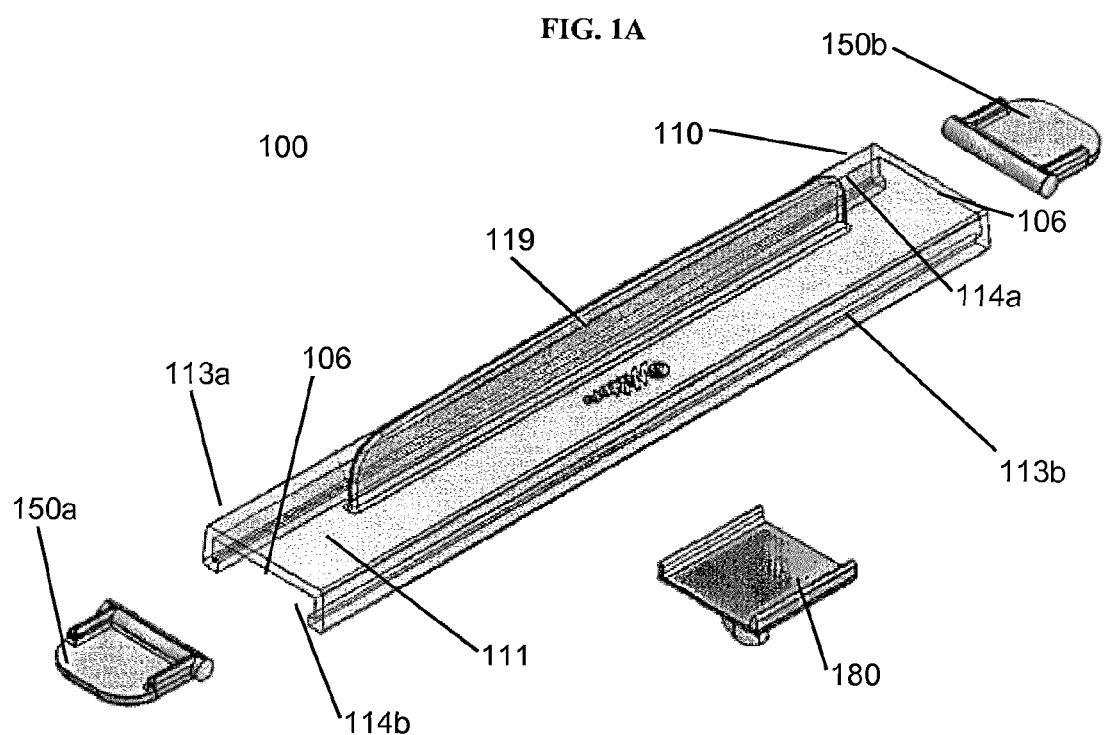

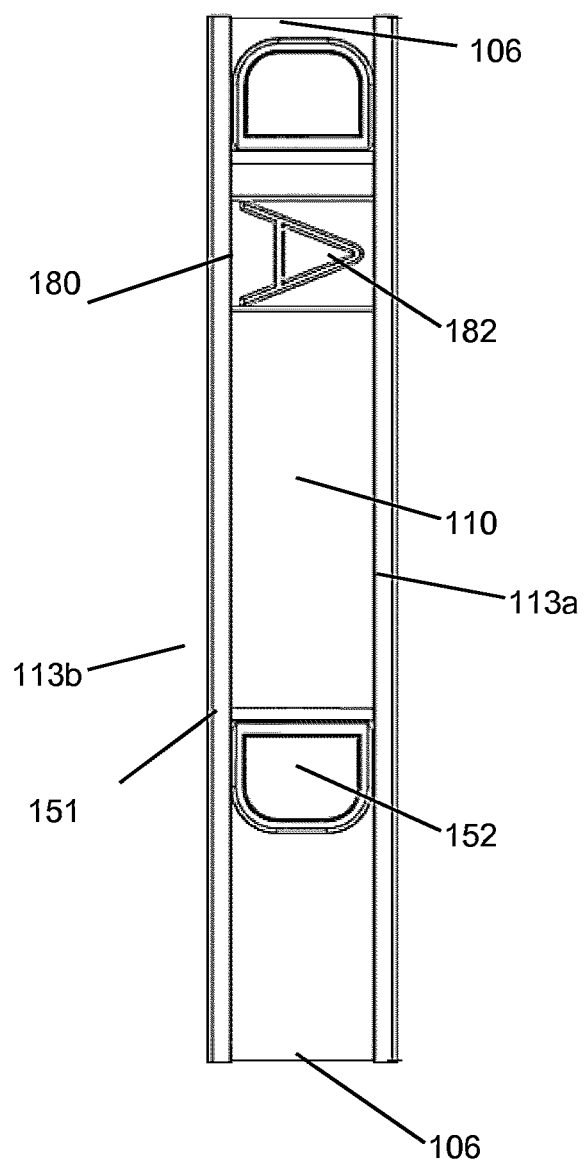

IMPRINT TOOL

FIELD OF THE INVENTION

The present invention relates generally to the field of imprinting tools. Specifically, the present application relates to a tool for making decorative impressions in surfaces.

BACKGROUND OF THE INVENTION

Food decorators often create impressions of designs in media including buttercream, fondant, gum paste, modeling dough, and cookie dough. These designs may include alphanumeric characters, symbols, or ornamental embellishments to decorate food products. The decorator may use presses comprising press pieces to create designs on the surfaces of food products. It can be difficult to achieve the desired impressions in a precise and repeatable manner.

A problem with the current presses is that they do not allow decorators to create impressions without press pieces moving during use. In addition, the current presses and press pieces do not allow decorators to see through the presses while creating impressions. That is, the opacity of current presses and press pieces obscure the sightline of the decorator at critical times during decoration. The opacity of current presses and press pieces also requires decorators to estimate the approximate location and orientation of the impression. Correct placement of the impressions on media is challenging to achieve and cannot be ensured.

Current presses do not allow for the impression pieces to remain fixed in desired configurations without movement. Decorators must currently use great delicacy and care in lifting and turning such presses over to avoid moving the impression pieces. Decorators often use their fingers to help keep the impression pieces in place, which is further complicated by the difficulty in aligning the press for placement as noted above. Many current presses do not facilitate combining alphanumeric and non-alphanumeric designs together. Decorators currently approximate the location of impressions when combining alphanumeric and non-alphanumeric designs, resulting in imperfect borders and lines. Such imperfections often extend decoration time because they may require the decorator to remove the imperfect impression and start over.

A need exists for improved technology, including technology that may address the above described disadvantages.

SUMMARY OF THE INVENTION

One embodiment of the invention relates to an imprinter for creating impressions of designs. The imprinter includes a retainer having a retainer body and at least one retaining portion and a lock configured to be received by the retainer, the lock having a lock retaining portion engageable with the retaining portion of the retainer to selectably secure the lock to the retainer.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The accompanying drawings, which are included to provide further understanding of the invention, are incorporated in and constitute a part of this specification, illustrate embodiments of the present disclosure and together with the detailed description serve to explain the principles of the present disclosure. No attempt is made to show structural details of the present disclosure in more detail than may be necessary for a fundamental understanding of the present disclosure and the various ways in which it may be practiced.

FIG. 1A illustrates an exploded view of an exemplary embodiment of an imprinter.

FIG. 5 illustrates an exemplary embodiment of the imprinter of FIG. 1 from a perspective closest to a surface of a desired location.

DETAILED DESCRIPTION OF THE PREFERRED EMBODIMENTS

Figure 1B:
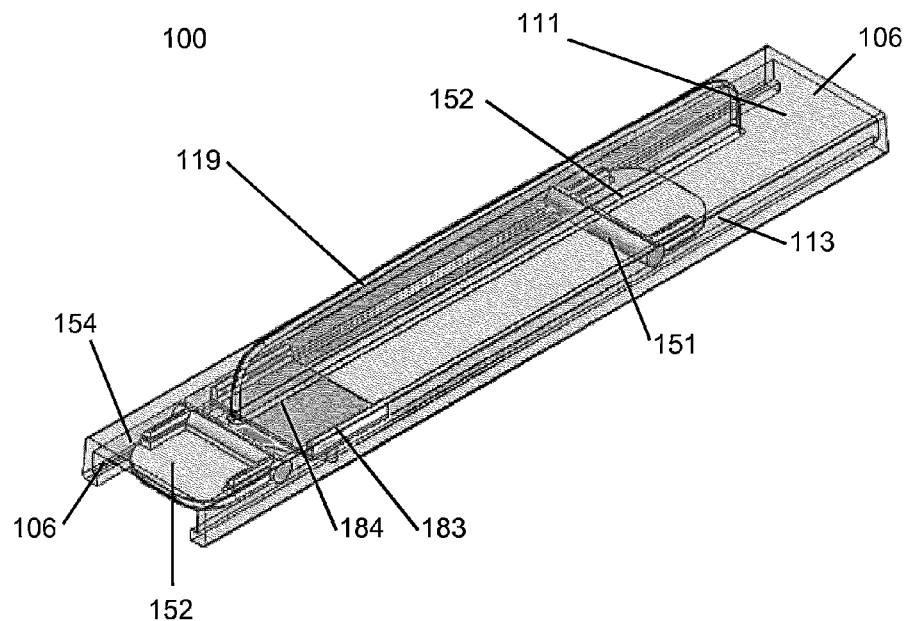
FIG. 1B illustrates a side view of the imprinter of FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

FIG. 1A illustrates an imprinter 100 that comprises a retainer 110 with retainer sides 113, a grip 119, at least one lock 150, which in one embodiment includes a first lock 150a and a second lock 150b at opposing ends 106 of the retainer. The imprinter 100 may be made of any suitable material, for example, plastic. The retainer 110 of the imprinter 100 may receive at least one press piece 180. The imprinter 100 may be any color. In addition, the imprinter 100 may be transparent or opaque, and the press piece 180 may be transparent or opaque. In a preferred embodiment, the imprinter 100 and at least one press piece 180 may be transparent. The press piece 180 may be made of any suitable material, for example, plastic. The retainer 110 and the press piece 180 may be made of different materials.

Figure 1C:
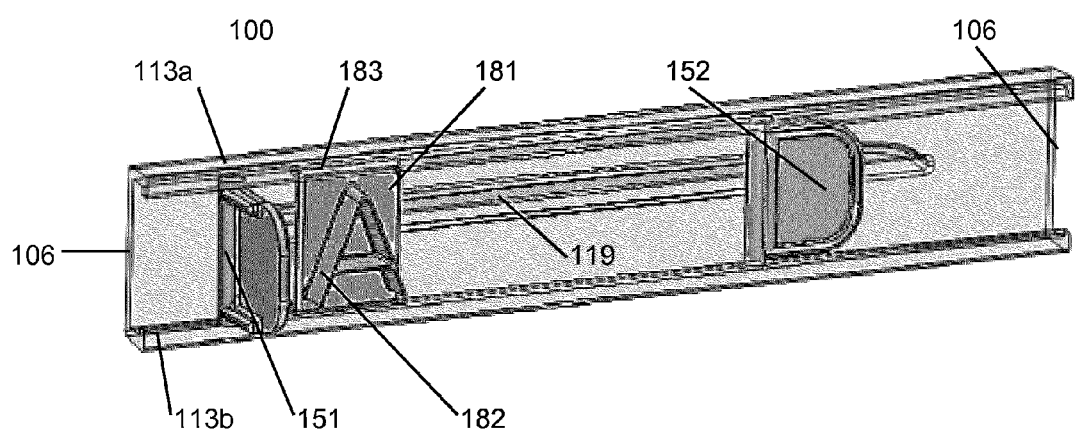
FIG. 1C illustrates a side view of the imprinter of FIG. 1 with a press piece featuring an alphanumeric design.

Referring now to FIGS. 1A-C, the imprinter 100 includes a retainer 110. The retainer 110 includes a retainer body 111. The retainer body 111 maybe substantially planar. Extending from the retainer body 111 are a first retaining portion 113a and a second retaining portion 113b. In one embodiment, the first retaining portion 113a extends from a first edge of the retainer body 111 parallel with the longitudinal axis of the retainer body 111. A second retaining portion 113b extends from a second edge, opposite the first edge, of the retaining body parallel with the longitudinal axis of the retainer body 111. The first retaining portion 113a and second retaining portion 113b may extend perpendicular to the plane of the retainer body 111. In one embodiment, each of the first retaining portion 113a and the second retaining portion 113b include a corresponding groove 114a, 114b for receiving a portion of the press piece 180. The grooves 114 may be formed as a recess in the respective first retaining portion 113a and second retaining portion 113b or may be formed by the presence of a flange on the respective first retaining portion 113a and second retaining portion 113b.

Referring now to FIGS. 2A-D, in one exemplary embodiment, a press piece 180 includes a deck 181 having a design 182 extending therefrom and sides 183. The press piece 180 further includes a back surface 184 (illustrated in FIG. 2D). When the press piece 180 is assembled with the retainer 110, the back surface 184 is adjacent to the retainer body 111 and the design 182 extends away from the retainer 110. The press piece 180 includes a retained portion 183 that is configured to engage with the retainer 110 to hold the press piece 180 to the retainer 110. In one embodiment, the retained portions 183 are sides of the press piece 180 configured to slide into sides 113 of retainer 110. In one embodiment, the retained portions 183 may substantially fill the short axis (height) of the grooves 114 such that the press piece 180 may be removed from the retainer 110 but when engaged with the retainer 110 is snugly fit so as to prevent substantial movement vertically when the retainer 110 is operated.

Figure 2A:
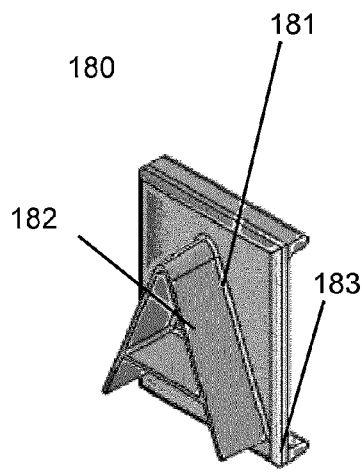
FIG. 2A illustrates a press piece featuring an alphanumeric design securable within the retainer of FIG. 1.
Figure 2B:
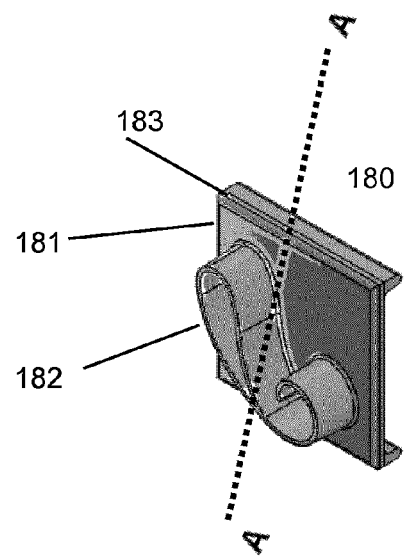
FIG. 2B illustrates a press piece featuring an ornamental design securable within the imprinter of FIG. 1.
Figure 2C:
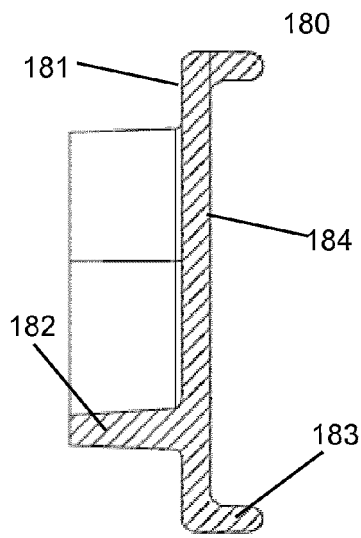
FIG. 2C illustrates a section view of a press piece securable within the imprinter of FIG. 1.
Figure 2D:
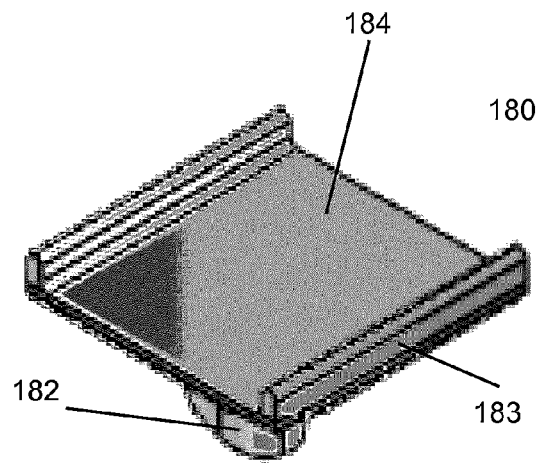
FIG. 2D illustrates an overhead view of the back of one of the press pieces of the imprinter of FIG. 1.

The design 182 of FIG. 2A is alphanumeric. In another exemplary embodiment, the design 182 may be ornamental (see FIG. 2B). The press piece 180 is removable from the retainer 110 for easy cleaning and for customizing combinations of designs to be imprinted with the imprinter 100.

Figure 3A:
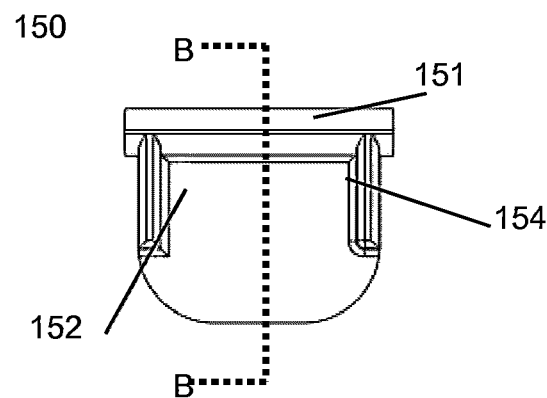
FIG. 3A illustrates a top view of one of the locks of FIG. 1.

With reference to FIG. 1A, the first lock 150a and the second lock 150b are engageable with the retainer 110. The first lock 150a and the second lock 150b each includes a lock retaining portion 151 and a lock deck 152, which may be tab-shaped as shown in FIG. 3A. In one embodiment, the retainer 110 is attached to a grip 119 for use in positioning the imprinter 100 over a surface. The grip 119 assists decorators in imprinting the design 182 at precise locations and angles for decorating. The retainer 110 has sides 113 between which at least one press piece 180 may slide into the retainer 110. The lock deck 152 of first lock 150a and second lock 150b may be turned toward the design 182 to secure the press piece 180 in place. The first lock 150a and the second lock 150b are configured to slide between sides 113 of retainer 110 and are disposable at opposing ends 106 of the retainer 110.

The first lock 150a and the second lock 150b are configured to secure at least one press piece 180. The first lock 150a and the second lock 150b may be configured to release at least one press piece 180 and allow for movement within the retainer 110 and removal from the retainer 110. Placement of the first lock 150a and the second lock 150b on opposing ends 106 of the retainer 110 sandwiches at least one press piece 180 between the first lock 150a and the second lock 150b. When the lock deck 152 of each lock is oriented to project perpendicularly to the retainer 110, contents of the retainer 110 are unlocked and may shift slightly within the retainer 110 during imprinting. In a preferred embodiment, first lock 150a and second lock 150b are both locked to inhibit movement during imprinting and are unlocked to facilitate easy removal of the press piece 180 and easy insertion of the press piece 180 into the retainer 110.

The exemplary embodiments described above do not limit the types of designs that may be used in the imprinter 100. For example, other designs that may be used in conjunction with imprinter 100 include symbols, curlicues, embellishments, illustrations, adornments, and artwork. In one embodiment, the press piece 180 features a design 182 that is scroll-like (see FIG. 2B). Moreover, in other embodiments, impressions may be made of combinations of different types of designs.

Figure 3B:
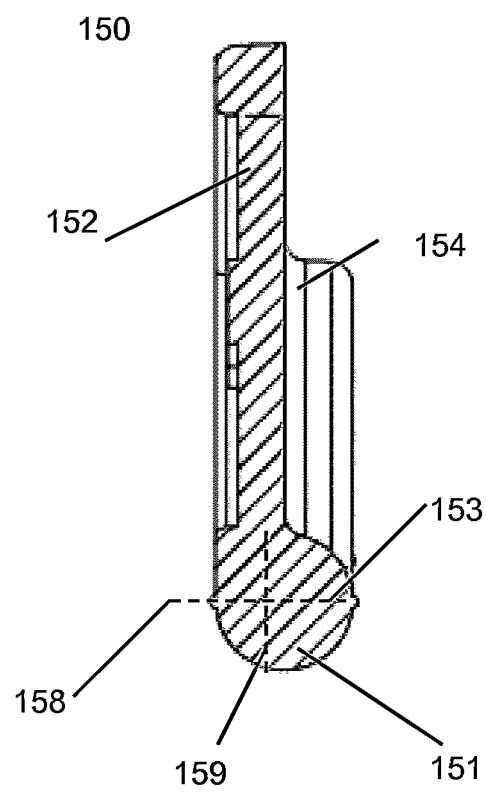
FIG. 3B illustrates a side view of one of the locks of FIG. 1.

Referring now to FIGS. 3A-B, the lock 150 includes a lock deck 152 and a lock retaining portion 151. In one embodiment, the lock retaining portion 151 is positioned at one end of the lock 150 and configured to engage the groove. In one embodiment, the lock retaining portion 151 comprises a cylinder. The lock retaining portion 151 may be a cylinder that extends at least the width of the lock deck 152 or may be in two parts with a first cylinder extending from one side of the lock deck 152 and a second cylinder extending from the other side of the lock deck 152. The lock retaining portion 151 comprises a major axis 158 and a minor axis 159, the major axis 158 corresponding to the longest diameter and the minor axis 159 to the shortest diameter.

In one embodiment, the major axis 158 is perpendicular to the plane of the lock deck 152. The major axis 158 is equal to or greater than the height of the groove 114 while the minor axis 159 is less than the height of the groove 114. Thus, the locking retaining portion 151 may slide along the groove 114 while the major axis 158 is not aligned perpendicular to the longitudinal axis of the retainer 110 (and its groove 114). The lock 150 may be slid into the groove 114 while it is non-parallel with the retainer 110. The lock 150 may be rotated, while the lock retaining portion 151 is in the groove 114, to rotate the relative positions of the major axis 158 and minor axis 159 with respect to the groove 114. Due to the size of the major axis 158, the rotation of the lock 150 will result in the lock retaining portion 151 becoming wedged within the groove 114 to secure the lock 150 in place relative to the retainer 110.

In one embodiment, the lock retaining portion 151 is shaped to provide a bi-stable structure, wherein the lock 150 is stable when substantially perpendicular—and free to slide in the groove 114—to the retainer 110. In such a perpendicular position, the lock 150 would extend from the retainer 110 and interfere with the imprinting. The lock 150 is also stable when substantially parallel—and unable to slide without substantial force relative to the groove 114—with the retainer 110. When in such a parallel position, the lock 150 does not extend from the retainer 110 sufficient to interfere with imprinting. In one implementation, the lock retaining portion 151 is an elliptical cylinder. In another implementation, illustrated in FIG. 3B, the lock retaining portion 151 includes one or more ridges 153. The ridges 153 provide a larger effective diameter than where the lock retaining portion 151 lacks ridges 153. In such an embodiment, the ridges engage the retainer 110 to secure the lock 150 when the lock 150 is positioned parallel to the retainer 110.

In one embodiment, the lock 150 has a ledge 154 bordering the lock deck 152 and extending from the lock deck 152 such that the ledge 154 is adjacent to the retainer body 111 when the lock 150 is parallel with the retainer 110. In one embodiment, illustrated in FIG. 3A, two ledges 154 are provided such that each ledge 154 abuts and runs perpendicular to the lock retaining portion 151. Each ledge 154 protrudes from the lock deck 152 to interfere with sides 113 of retainer 110 to ensure that first lock 150a and second lock 150b fasten at least one press piece 180 between the sides 113 of retainer 110. The ledge 154 may serve as a stop to limit rotation of the lock 150 with respect to the retainer 110. For example, the ledge 154 may prevent the lock 150 from rotating past the point where the major axis 158 is when the lock deck 152 is oriented in a first position to parallel retainer 110, and interference is created between each ledge 154 and sides 113 of retainer 110 to inhibit movement. When the lock deck 152 is oriented to be in a second position to be perpendicular to the design 182 and to retainer 110, movement is allowed. The lock deck 152 has a width, and, in one embodiment, the lock retaining portion 151 has a width that exceeds the width of lock deck 152. The width of lock deck 152 is less than the distance between the opposing grooves 114 to allow the lock 150 to rotate relative to the retainer 110.

Figure 4A:
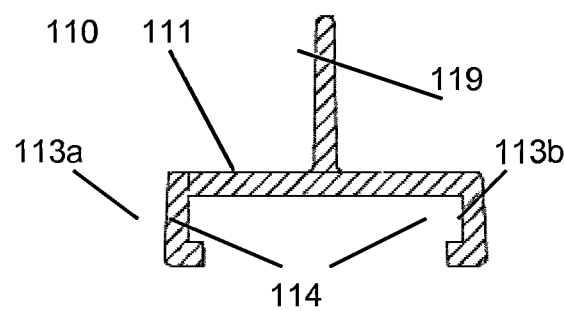
FIG. 4A illustrates a cross-sectional view of the retainer of FIG. 1.
Figure 4B:
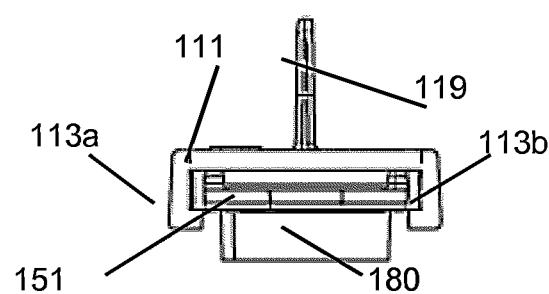
FIG. 4B illustrates a cross-sectional view of the retainer of FIG. 1 when the retainer has received at least one press piece.

The press piece 180 has a design 182 projecting in a first direction away from the retainer 110 and towards a surface to be imprinted (see FIG. 1C). A press piece 180 comprising a back 184 may be oriented in the retainer 110 so that the design 182 contacts the desired surface while the back 184 of the press piece 180 faces towards retainer 110 (see FIG. 5). As illustrated in FIG. 4A, the grip 119 projects from the retainer 110 in a second direction opposed to the first direction. Sides 113 of the retainer 110 project in the first direction. The grip 119 allows for manual positioning of imprinter 100 at a desired location. The grip 119 is approximately equidistant between sides 113 of retainer 110 and provides for imprinter 100 to be used comfortably and safely.

Referring now to FIG. 1C, sides 183 of press piece 180 extend in a second direction opposite to the first direction that the design extends along. Sides 183 of press piece 180 are configured to be inserted between sides 113 of retainer 110. FIG. 5 illustrates an embodiment when viewed from the surface to be imprinted. An embodiment formed of transparent material removes guesswork from positioning the imprinter to create impressions in a surface at a desired location because a decorator can view the position of at least one press piece 180 within the retainer 110 prior to applying force to the imprinter 100.

In one embodiment, the imprinting tool may include only a first lock 150a. The first lock 150a may be engageable at one end of the retainer 110, with the second end of the retainer 110 retaining the press pieces 180 such that a second lock 150b is not necessary to retain the press pieces 180.

In one embodiment, the first lock 150a and the second lock 150b are chiral, being non-superimposable mirror images of each other and are designed to only secure the retainer 110 from their respective ends. In another embodiment, the first lock 150a and the second lock 150b are identical and may be interchanged to secure the retainer 110 from either end.

In one embodiment, a lock 150 may positioned between two press pieces 180 such as to serve as a spacer. In such embodiment, the lock 150 does not extend from the retainer 110 sufficiently to leave an imprint when the imprinter 100 is used. Thus, the lock 150 may serve to additionally secure press pieces 180 other than from an end and may also serve as a spacer, such as where a decorator wishes to form works from letters on press pieces 180.

In one embodiment, the press piece 180 may be inserted into the retainer 110 with the design 182 facing outward, i.e. away from the retainer, or inward, i.e. disposed between the deck 181 and the retainer body 111. In this embodiment, storage of the press piece 180 with the design inwardly facing can protect the design 182 from damage, such as during travel. Further, press pieces 180 that are inserted into the retainer 110 facing inward may be used as spacers between outwardly facing press pieces 180 to provide spaces between imprinted designs.

In one embodiment, the retainer 110 includes a plurality of retaining portions. In this embodiment, a plurality of grooves 114 each for receiving a portion of the press piece 180 are disposed to permit rows of press pieces 180 to be stacked in the retainer 110. In such embodiment, imprinter 100 can imprint at least one design 182, and resulting impressions on a surface of a desired location can surpass the design 182 of the press piece 180 in height and width. In this embodiment, the retainer body 111 comprises pairs of grooves 114 parallel to each other. Press pieces 180 can be disposed horizontally and vertically relative to each other to permit rows and columns of imprinted designs.

A method of using imprinter 100 is now described. Referring to FIGS. 1-5, at least one press piece 180 with a design 182 is selected. Each press piece 180 is inserted into a retainer 110 to be oriented parallel to a desired location for imprinting. A first lock 150a and a second lock 150b are positioned on opposing ends 106 of the retainer 110. A tab-shaped portion of each lock of first lock 150a and second lock 150b is turned in a first position parallel to the design 182 to secure each press piece 180. A grip 119 is used to position imprinter 100 over a surface at a desired location. Force is applied to imprinter 100 so that the design 182 of at least one press piece 180 is impressed on the surface.

The imprinter described above provides several advantages. The decorator can readily imprint designs on the surface of a desired location accurately and with consistent results. A plurality of combinations of designs are achievable. The grip 119 and the retainer 110 allow for placement of designs directly on the surface without manually positioning the press piece at the desired location. The method of imprinting described above may be more sanitary as there may be less contact with the decorator's hands and higher precision of design location and angle. Embodiments comprising translucent materials may allow the decorator to see the surface at the desired location, reducing delay and improving decoration speed and quality.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An imprinter comprising:
   a retainer having a retainer body and at least one retaining portion configured to receive a first lock, a second lock, and a plurality of press pieces; and
   the first lock and the second lock configured to be received by the retainer, the first lock having a first lock retaining portion engageable with the at least one retaining portion of the retainer to selectably secure the first lock to the retainer and the second lock having a second lock retaining portion engageable with the at least one retaining portion of the retainer to selectably secure the second lock to the retainer;

at least one press piece comprising a face depicting a design and configured to contact a surface of a desired location when the at least one press piece is positioned in the retainer and a back oriented to contact the retainer;

wherein sides of the retainer project in a first direction that opposes projection of a grip in a second direction;

wherein sides of the at least one press piece project in a third direction that opposes projection of the design in the first direction;

wherein sides of the at least one press piece are configured to slide into the retainer to allow ingress and egress of the at least one press piece when a lock deck of the first lock and a lock deck of the second lock are turned to align perpendicular to the retainer and parallel to the grip.

2. The imprinter of claim 1, wherein the grip is configured to permit positioning of the imprinter to impress a design on a surface of a desired location, and wherein the design is positioned in a first direction that opposes the grip projecting from the retainer in a second direction.

3. The imprinter of claim 2, wherein rotation of one of the first lock or the second lock results in the respective of the first and second lock retaining portion becoming wedged to secure the lock in place relative to the retainer.

4. The imprinter of claim 2, wherein application of force to the imprinter leads the design of each press piece secured in the retainer to appear on a surface of the desired location.

5. The imprinter of claim 2, wherein the grip is configured to permit manual positioning of the imprinter to impress designs at a desired angle.

6. The imprinter of claim 2, wherein the first lock and the second lock are interchangeable and removable.

7. The imprinter of claim 1, wherein selection of a plurality of press pieces and placement of the plurality of press pieces into the retainer allows for the imprinter to impress a plurality of designs simultaneously, and wherein a plurality of combinations of designs are achievable.

8. The imprinter of claim 7, wherein one of the first lock and the second lock may serve as a spacer between a plurality of press pieces and may be positioned other than from an end of the retainer.

9. The imprinter of claim 1, wherein the first lock and the second lock are rotatable from a first position to a second position, the first lock comprising:

the first lock deck having a first length;

the first lock retaining portion having a second length that exceeds the first length; and a first lock first ledge and a first lock second ledge protruding from sides of the first lock deck, the first lock first ledge and the first lock second ledges being adjacent to the first lock retaining portion and perpendicular to the second length of the first lock retaining portion;

the second lock comprising;

the first lock deck having a first length;

the first lock retaining portion having a second length that exceeds the first length; and a second lock first ledge and a second lock second ledge protruding from sides of the first lock deck, the second lock first ledge and the second lock second ledges being adjacent to the first lock retaining portion and perpendicular to the second length of the first lock retaining portion;

wherein each first lock ledge and second lock ledge are disposed to inhibit movement of the first lock and the second locks when the respective first lock deck or second lock deck is turned to align parallel to the retainer and perpendicular to the grip;

wherein each first lock ledge and second lock ledges are disposed to permit movement of the respective first lock and second locks when the respective one of the first lock deck and second lock deck is turned to align perpendicular to the retainer and parallel to the grip.

10. The imprinter of claim 1, wherein the at least one press piece is formed of translucent material.

11. The imprinter of claim 1, wherein the imprinter is formed of translucent material.

12. The imprinter of claim 1, wherein the at least one retaining portion occupies space within the retainer body such that at least one of the plurality of press pieces is removable from the retainer but fits snugly when cooperatively engaged with the retainer to prevent movement during imprinting.

13. The imprinter of claim 1, wherein the retainer maintains a desired spacing between a plurality of press pieces.

14. The imprinter of claim 1, wherein the grip for positioning the imprinter projects from the retainer.

15. An imprinter comprising:

at least one removable press piece configured to impress designs, each press piece featuring a face that depicts a design;

a retainer having a retainer body, a grip extending therefrom and at least one retaining portion extending from the retainer body opposite the grip, sides of the retainer project in a first direction that opposes projection of the grip in a second direction; and a lock configured to be slidably received by the at least one retaining portion, the lock having a lock retaining portion engageable with the retaining portion of the retainer to selectably secure the lock to the retainer;

the retainer is configured to receive the lock and the removable press piece;

the lock further comprising:

a lock deck having a first length;

a retaining portion having a second length that exceeds the first length; and a first ledge and a second ledge protruding from sides of the lock deck, the first ledge and the second ledge being adjacent to the retaining portion and perpendicular to the second length;

wherein the first ledge and second ledges are disposed to inhibit movement of the locks when the lock deck is turned to align parallel to the retainer and perpendicular to the grip; and further wherein the first ledge and second ledges are disposed to permit movement of the locks when the lock deck is turned to align perpendicular to the retainer and parallel to the grip.

16. An imprinter comprising:

a retainer having a retainer body and at least one retaining portion configured to receive a first lock, a second lock, and a plurality of press pieces; and the first lock and the second lock configured to be received by the retainer, the first lock having a first lock retaining portion engageable with the at least one retaining portion of the retainer to selectably secure the first lock to the retainer and the second lock having a second lock retaining portion engageable with the at least one retaining portion of the retainer to selectably secure the second lock to the retainer;

each of the first and second locks comprising:

a lock deck having a first length;

a retaining portion having a second length that exceeds the first length; and a first ledge and a second ledge protruding from sides of the lock deck, the first ledge and second ledge being adjacent to the retaining portion and perpendicular to the second length, wherein the first ledge and second ledges are disposed to inhibit movement of the first and second locks when the lock deck is turned to align parallel to the retainer and perpendicular to a grip;

wherein the first ledge and second ledge are disposed to permit movement of the first and second locks when the lock deck is turned to align perpendicular to the retainer and parallel to the grip;

wherein sides of the retainer project in a first direction that opposes projection of the grip in a second direction; and wherein the first and second lock are rotatable from a first position to a second position.

* * * * *